Figure 1:
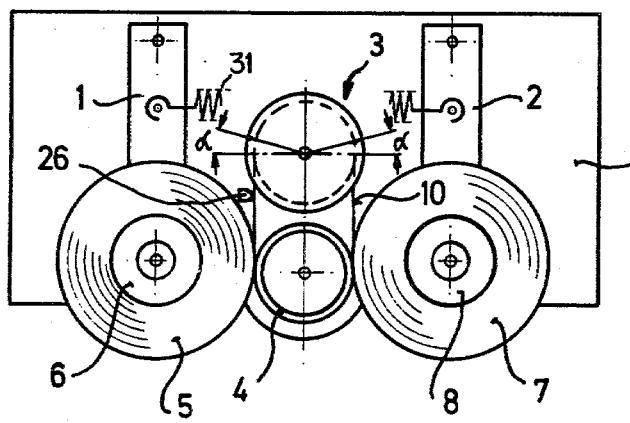

United States Patent [19]

Schoettle et al.

[11] 4,238,088
[45] Dec. 9, 1980

[54] GUIDE FOR A THIN TAPE-LIKE RECORDING MEDIUM, PARTICULARLY A MAGNETIC TAPE

[75] Inventors: Klaus Schoettle, Heidelberg; Werner Hoffmann, Ludwigshafen; Eduard Kaemmer, Mutterstadt, all of Fed. Rep. of Germany

[73] Assignee: BASF Aktiengesellschaft, Ludwigshafen, Fed. Rep. of Germany

[21] Appl. No.: 52,105

[22] Filed: Jun. 26, 1979

[30] Foreign Application Priority Data

Jul. 12, 1978 [DE] Fed. Rep. of Germany ....... 2830615

[51] Int. Cl.³ .................... G11B 15/32; G11B 15/66
[52] U.S. Cl. .................................... 242/192; 242/195
[58] Field of Search .................. 242/76, 192–195; 226/189, 190, 196, 198

[56] References Cited

U.S. PATENT DOCUMENTS

| | | | |
|---|---|---|---|
| 3,317,104 | 5/1967 | Hughes et al. | 226/183 |
| 3,348,784 | 10/1967 | Gardiner et al. | 242/192 |
| 4,022,400 | 5/1977 | Rotter et al. | 242/192 |
| 4,098,446 | 7/1978 | Schoettle et al. | 226/196 |

Primary Examiner—Leonard D. Christian
Attorney, Agent, or Firm—Keil & Witherspoon

[57] ABSTRACT

A tape guide, especially a guide for thin magnetic tapes which are subjected to strong acceleration forces in the longitudinal direction, and a tape transport apparatus with a central capstan, comprising such a tape guide. The tape guide includes one or two rotatable, but fixedly arranged guide rollers having flanges arranged around part of the periphery thereof, which flanges each have an ingress and an egress chamfer for the tape. When one guide roller is used, the magnetic head is positioned between a tape reel and the guide roller and, when two guide rollers are used, it is positioned between the said two rollers, the magnetic head bearing against the unsupported span of tape in each case. The tape guide may be provided with means for producing cushions of air for stabilizing the roller as it rotates.

17 Claims, 8 Drawing Figures

GUIDE FOR A THIN TAPE-LIKE RECORDING MEDIUM, PARTICULARLY A MAGNETIC TAPE

The present invention relates to a guide for a thin tape-like recording medium, particularly a magnetic tape which, when transported past a magnetic head, is subjected to strong acceleration forces in the longitudinal direction, wherein at least one fixedly arranged, rotatable guide roller is located between two fixed arcuate guide flanges.

German Published Application DAS No. 1,625,592 discloses a rotatable guide roller for magnetic tapes which is located between stationary surfaces for guiding the longitudinal edges of the tape. However, the rotatable guide roller is also pivotable about its axis of rotation, so that the plane in which the tape is guided varies.

German Pat. No. 1,249,340 discloses a tape guide wherein the surface of the guide roller which is rotatably mounted between two stationary disc-shaped members is covered with velvet to prevent longitudinal oscillations of the tape. The said disc-shaped members do not have any tape guiding function. Riding up of the tape onto the said disc-shaped members is therefore unavoidable.

U.S. Pat. No. 3,317,104 describes a rotatable tape guide roller having a fixed and a spring-loaded flange for guiding the tape in the vertical direction.

U.S. Pat. No. 4,098,446 relates to a stationary tape guide for thin magnetic tapes which are transported at high speed, a concave guide surface and a cushion of air, produced by introducing air through orifices, serving to guide the tape. Despite the use of this cushion of air produced by the introduction of extraneous air, it is not possible to prevent the tape from making contact with the guide surface in certain places, particularly in the case of very thin and flexible magnetic tapes. Further disadvantages of this type of tape guide are that there is considerable friction between the tape and guide surface at the points of contact, and that they are of complicated design.

Other known rotatable guide rollers with integral flanges have the disadvantage that, when thin tapes are used, the tape is folded over by the rotating flanges or rides up on the flanges.

Consequently, all prior art tape guides suffer from the drawback that they cause tape damage and provide no or only poor guidance of the tape in the vertical direction.

An object of the present invention is to provide a low-friction tape guide which provides exceptionally good guidance of the tape in the vertical direction and is so designed that it can be manufactured simply and economically. A particular object of the invention is to provide a tape guide which is suitable for use in portable video recorders of small overall dimensions, and does not require any maintanance.

We have found that these objects are achieved with a guide for a thin tape-like recording medium, particularly a magnetic tape which, when transported past a magnetic head, is subjected to strong acceleration forces in the longitudinal direction, wherein at least one fixedly arranged, freely rotatable guide roller is located between two fixed arc-shaped guide flanges, and the said guide flanges are arranged around part of the periphery of the guide roller and each have an ingress and an egress chamfer for the tape.

Apart from offering precise tape guidance, this design has the advantage that air entrained by the tape can escape from between the tape and guide roller, and the tape lies uniformly on the guide surface of the guide roller.

In a further embodiment of the invention, the fixed guide flanges are arranged symmetrically with respect to the central plane of rotation of the guide roller and at the same time around part of the periphery of the guide roller in an arc $\beta$ of at least $90° - 2\alpha$, $\alpha$ being the arc length of one of the chamfers.

In an advantageous embodiment of the invention, the guide flanges are arranged around part of the periphery of the guide roller in an arc $\beta$ of $180° - 2\alpha$.

In a practical embodiment, the chamfers, i.e. the ingress and egress zones for the tape, each have an arc length $\alpha$ corresponding to an angle of from 5° to 30°, preferably from 10° to 15°.

In a further advantageous embodiment of the invention, a single guide roller is provided, so that the magnetic head cooperates with the unsupported span of tape extending between a tape reel and the guide roller.

To obtain symmetry with respect to the magnetic head, two guide rollers arranged in spatial relationship are provided, the head cooperating with the unsupported span of tape extending between the two guide rollers.

In a further embodiment, the guide flanges, when viewed in plan, are each provided with a ring of holes, so that a pumping action is obtained when the guide roller rotates, with the result that cushions of air are produced for the stabilization of the guide roller as it rotates.

In yet another advantageous embodiment of the invention, the opposite outer arcuate edges of the guide flanges are provided with bevelled guide surfaces for centering the tape in the central plane of rotation of the guide roller.

It is also advantageous to provide the guide roller with a convex guide surface, so that a centering action is exerted on the tape.

The above-described tape guide can be used with particular advantage in a tape transport apparatus having a central capstan. Accordingly, the present invention also relates to a transport apparatus of the following design:

A tape transport apparatus comprising a central capstan and take-up and supply reels which can be urged toward the capstan by biasing means and are rotatably mounted on supports that can be moved toward and away from the capstan, the capstan being provided with a resilient peripheral portion, so that compressive forces between the capstan and the take-up and supply reels and hence driving forces for rotating the reels can be produced, and the tape leaving the supply reel being guided over at least one fixedly arranged, rotatable guide roller and a magnetic head to the take-up reel where it is wound up, wherein the guide roller is located between two fixed guide flanges, and the said flanges are arranged around part of the periphery of the guide roller.

In a further practical embodiment of the tape transport apparatus of the invention, the guide flanges of the tape guide each have an ingress and an egress chamfer for the tape, and are arranged around part of the periphery of the guide roller in an arc $\beta$ of at least $90° - 2\alpha$, preferably in an arc $\beta$ of $180° - 2\alpha$, $\alpha$ being the arc length of one of the chamfers.

Figure 2:
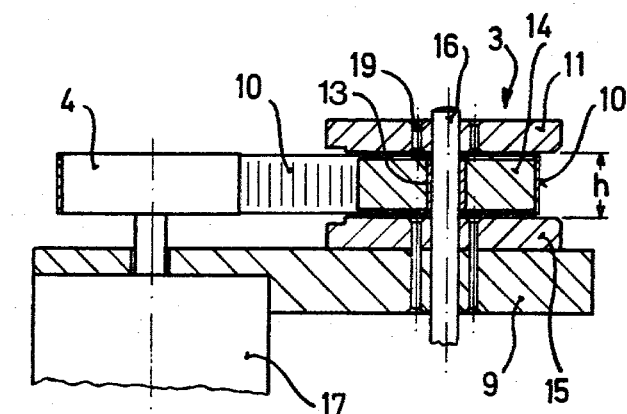
Figure 2A:
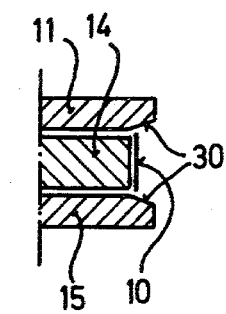
Figure 3:
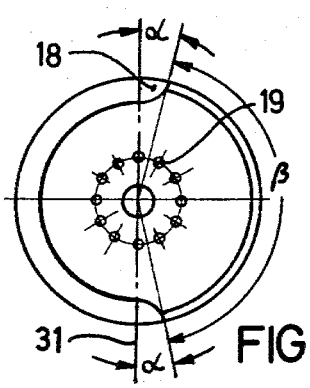
Figure 4:
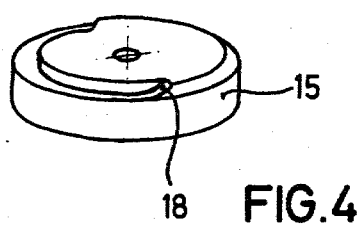
Figure 5:
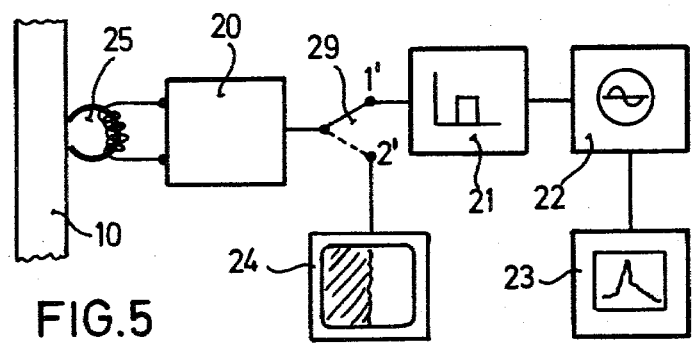
Figure 6:
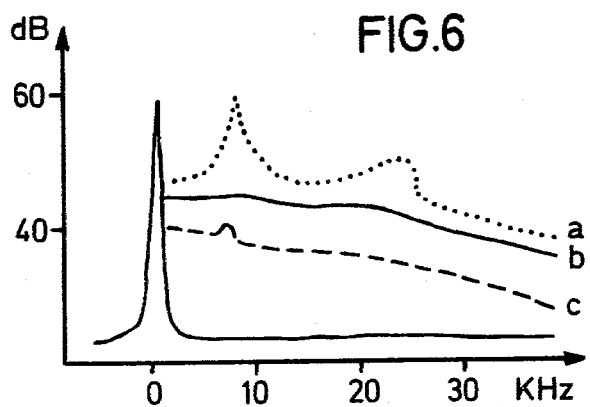
Figure 7:
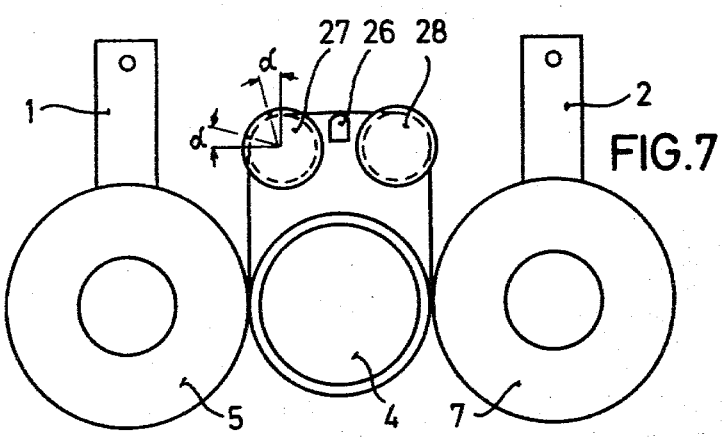

Further details of the invention are disclosed in the following description of the embodiments illustrated in the accompanying drawings, in which FIG. 1 is a diagrammatic plan view of a tape transport apparatus with a central capstan, showing one embodiment of the tape guide of the invention with a single guide roller, FIG. 2 is a side view, partly in section, of the tape guide of FIG. 1 and the capstan and its motor, FIG. 2a is a cross-sectional view of part of the tape guide of FIG. 2, but with inclined guide surfaces on the fixed flanges, FIG. 3 is a plan view of a guide flange with a ring of holes, FIG. 4 is a perspective view of the guide flange of FIG. 3, but without the ring of holes, FIG. 5 is a block diagram of the test circuit employed, FIG. 6 is a graph showing the flutter frequency distribution, and FIG. 7 is a diagrammatic plan view of the tape transport apparatus of FIG. 1, showing another embodiment of the tape guide of the invention with two guide rollers.

FIG. 1 shows a tape transport apparatus with a central capstan 4, swing arms 1 and 2, tape guide 3 according to the present invention, hubs 6 and 8, tape reels 5 and 7, and deck 9 on which the parts are mounted. The tape 10 is provided with, for example, a large number of parallel magnetic tracks; it is fed from reel 7, which is urged against capstan 4 by a biasing means 31, over tape guide 3, mounted on a shaft, to hub 6 which is also so urged against capstan 4 and where the tape is wound up, and vice versa, the tape being transported in both directions at high speed. Magnetic head 26 cooperates with the unsupported span of tape extending between tape guide 3 and tape reel 5 or capstan 4.

FIG. 2 is a side view, partly in section, of tape guide 3, also showing capstan 4 and drive motor 17. Tape guide 3 consists essentially of guide roller 14 which is rotatably mounted on shaft 16, and stationary guide flanges 11 and 15 which are arranged symmetrically with respect to the central plane of rotation of guide roller 14 (hereinafter referred to as "fixed flanges"). As can be seen from this Figure, there is a gap of preferably 0.05 to 0.3 mm between the guide roller and each fixed flange 11, 15. These gaps may be produced by using, for example, disc-shaped distance pieces (not shown in the drawing). The ensure trouble-free running, the guide roller 14 is provided with a suitable bearing, advantageously a sintered metal bearing 13. The usual material of construction of the guide roller 14 is metal. If it is desired to additionally damp tape oscillations, a heavy metal, such as brass, or a metal shell filled with lead should advantageously be used. The guide surface of the guide roller 14 advantageously has an average peak-to-valley height $R_z$ of about 0.5 to 5 μm, preferably 2.5 μm (according to DIN 4768). It is also expedient to provide the guide roller with a slightly convex guide surface.

FIG. 2a shows in cross-section part of the tape guide of the invention with bevels 30 on the fixed flanges 11 and 15 which thus have a centering action on the tape 10.

As shown in FIGS. 3 and 4, the upper and lower flanges 11 and 15 each have two chamfers 18 in the areas at which the tape enters and leaves the tape guide, the chamfers being arranged at points located at an angle α behind the line of ingress and egress of the tape 10, the line of ingress and egress of the tape being central axis 31, so that in the case of the single roller variant shown in FIG. 1 arc length β corresponds to an angle of 180°−2α. Angle α is from 5 to 30°, preferably from 10° to 15°. In the case of the embodiment of FIG. 7 having two guide rollers 27 and 28 arranged symmetrically with respect to magnetic head 26, arc length β corresponds in each case to an angle of 90°−2α, angle α being of the same order of magnitude as indicated above.

Although the fixed flanges 11 and 15 shown in FIGS. 1 to 4 and 7 are circular in shape, the effective guiding zone thereof is arc-shaped (arc β).

The above-described design ensures that any air caught between the magnetic tape 10 and guide rollers 14 and 27 and 28 can escape, that the tape lies uniformly on the surface of the guide roller, and that the tape is in a stabilized position on the guide roller, from which position it is brought gradually into the position in which it is guided in the vertical direction by flanges 11 and 15; the position in which the tape is stabilized on the guide roller usually does not coincide with the position in which it is guided in the vertical direction because of tape width variations and manufacturing tolerances of the tape transport apparatus. Height h corresponds to the largest tape width plus up to a maximum of 0.3 mm, preferably plus 0.1 mm. In the case of a guide roller having a convex guide surface, the preferred value is from 0 to 0.1 mm.

FIG. 3 shows a variant of the guide flange; in this variant the guide flange is provided with a ring of holes 19. As a result of this arrangement of holes 19 in fixed flanges 11 and 15, the flanges and the guide roller 14, when it rotates, act like a self-priming pump. Cushions of air are thus formed between the guide roller and the lateral surfaces of the fixed flanges 11 and 15, which air cushions stabilize the guide rollers 14 and 27 and 28 as they rotate, and have the additional advantage that they prevent the magnetic tape from entering the gaps between the guide rollers 14 and 27 and 28 and the fixed flanges 11 and 15. For economic reasons fixed flanges 11 and 15 are advantageously identical. The surfaces of the fixed flanges 11 and 15 which face one another may also be provided with a highly abrasion-resistant coating, e.g. a coating of tungsten carbide or ceramic material, by for example vacuum deposition, spraying, electroplating or laminating. It is of course also possible to make the fixed flanges 11 and 15 entirely of ceramic material, tungsten carbide or precious stone.

The following two fundamentally similar tape transport apparatus having a central capstan were compared with one another:

1. A tape transport having a stationary crescent-shaped two-part tape guide employing a film of extraneous air, the concave side of the tape guide being arranged adjacent to part of the periphery of the capstan having a diameter of 3 cm, and the magnetic head being disposed between the two parts of the guide. The width of the guide surface was 6.28 mm, and the mean distance between the flanges for guidance of the tape in the vertical direction was 6.30 mm.

2. A tape transport having a tape guide according to the present invention as shown in FIGS. 1 to 4, the capstan and guide roller each having a diameter of 3 cm. The height of the guide roller was 6.10 mm, and the distance between the flanges was 6.30 mm.

The two tape transport apparatus did not have any kind of special device for preventing or reducing tape flutter or any kind of device for correcting time base errors.

The same test circuit of the type shown in FIG. 5 was used for all measurements. In the drawing, block 20 denotes the electronic playback/record components of the tape transport apparatus, block 21 a band-pass filter having a bandwidth of 1 to 30 kHz, block 22 an oscillograph, and block 23 a spectrum analyzer.

Band-pass filter 21 serves to suppress unwanted HF signal components and is connected to the demodulator of the electronic playback/record components.

Spectrum analyzer 23 is set to a bandwidth of 0.3 kHz.

In position 2' of switch 29, a composite video signal in the form of a black-to-white transition was recorded on the tape 10, and in the test was reproduced by means of playback head 25 and the electronic playback components.

In switch position 2' all time base errors are visible on monitor 24 as jitter of the black-to-white transition.

In switch position 1' a fixed frequency $f_o$ of 3 MHz is recorded. The screen of oscillograph 22 shows the demodulated signal and hence the time base errors in the form of a shift in the zero crossovers of the demodulated signal. The flutter frequency spectra of the two tape transport apparatus shown on spectrum analyzer 23 are given in FIG. 6 in the form of curves a and b, dotted curve a belonging to tape transport 1 and unbroken curve b to tape transport 2. The spectrum analyzer shows the disturbances in the frequency and amplitude of the signal caused by, for example, oscillations of the tape in the longitudinal direction (scrape flutter). The third dashed curve c shows the demodulation noise. The first pulse at 0Hz is the zero beat of the analyzer; it can be seen from curves a to c that the main flutter frequency is at about 7 kHz.

The percentage scrape flutter factor $S_F$ can be calculated with the aid of the following equation:

$$S_F[\%] = \frac{f_1}{f_0} \times 100 = \frac{USF}{f_0 \times U_{maxdemo}} \times \Delta f \times 100$$

where $f_0$ denotes the frequency of 3 MHz (the frequency of the peaks of the horizontal line pulses), $f_1$ denotes the flutter frequency concerned, USF denotes the voltage at the determined flutter frequency $f_1$, $U_{maxdemo}$ denotes the maximum output D.C. voltage of the demodulator (in this instance 2 volts), and f denotes the entire frequency deviation (in this instance 1.3 MHz).

The results obtained with the two tape transport apparatus are given in the following Table:

TABLE

| Tape transport | $U_{SF(mV)}$ | $S_F(\%)$ | $\Delta t$ (μsec) | $\Delta t$ (%) |
|---|---|---|---|---|
| 1 | 18 | 0.39 | 0.8 | 1.25 |
| 2 | 4 | 0.09 | 0.2 | 0.3 |

The Δt (μusec) column lists the visible high frequency time base errors which were read off on the oscillograph, and the Δt (%) column the percentage errors based on a line duration of 64 μsec (=100%). The limit for visual detection of time base errors on the screen of oscillograph 22 is 0.2%, corresponding to 1.28μusec, so that the above value of 0.3% can be read off without difficulty.

To sum up, the percentage scrape flutter factor was able to be reduced from 0.39% to 0.09%, i.e. a value which is about 4.5 times less. A distinct reduction in the percentage scrape flutter factor, i.e. to one third, was achieved with a tape transport of the first-mentioned type which was provided with an expensive electronic time base error correction device based on a charged coupled device.

As can be seen from FIG. 6, there is a reduction in the amplitude of the unwanted signal of from 10 to about 20 db, corresponding to factors of from 3.3 to 10.

We claim:

1. A guide arrangement for a thin tape-like recording medium, especially a magnetic tape which, when transported past a magnetic head, is subjected to strong acceleration forces in the longitudinal direction, said arrangement comprising:
   at least one guide roller mounted for rotation about a relatively stationary axis, and
   two relatively stationary, arc-shaped guide surfaces, each facing said guide roller on one side thereof, extending around part of the periphery of the guide roller and having an ingress and an egress chamfer for the tape,
   whereby entrapment of air between the tape and the guide roller is substantially reduced and gradual entry of the tape into the zone of effective lateral guidance of the tape is insured.

2. A guide arrangement as claimed in claim 1, wherein the guide surfaces are arranged symmetrically with respect to the central plane of rotation of the guide roller and at the same time around part of the periphery of the guide roller in an arc β of at least 90°−2α, α being the arc length of one of the chamfers.

3. A guide arrangement as claimed in claim 2, wherein the guide surfaces are arranged around part of the periphery of the guide roller in an arc α of 180°−2α.

4. A guide arrangement as claimed in claim 2, wherein the chamfers each have an arc length α corresponding to an angle of from 5° to 30°.

5. A guide arrangement as claimed in claim 4, wherein the chamfers each have an arc length α corresponding to an angle of from 10° to 15°.

6. A guide arrangement as claimed in claim 1, wherein a single guide roller is provided, and the magnetic head cooperates with the unsupported span of tape extending between a tape reel and the guide roller.

7. A guide arrangement as claimed in claim 1, wherein two guide rollers arranged in spatial relationship are provided, and the magnetic head cooperates with the unsupported span of tape extending between the two guide rollers.

8. A guide arrangement as claimed in claim 1, wherein the opposite outer arcuate edges of the guide surfaces are provided with bevelled guide portions for centering the tape in the central plane of rotation of the guide roller.

9. A guide arrangement as claimed in claim 1, wherein the guide roller is provided with a convex guide surface.

10. A guide arrangement for a thin tape-like recording medium, especially a magnetic tape which, when transported past a magnetic head, is subjected to strong acceleration forces in the longitudinal direction, said arrangement comprising:

at least one guide roller mounted for rotation about a relatively stationary axis, and two relatively arc-shaped guide surfaces, each facing said guide roller on one side thereof, extending around part of the periphery of the guide roller and having an ingress and an egress chamfer for the tape, said arc corresponding to an angleof at least 90° less the two arc lengths of the ingress and egress chamfers each corresponding to an angle of 10°-to-15°, and being arranged symmetrically with respect to the central plane of rotation of the guide roller.

11. A guide arrangement as claimed in claim 10, wherein a single guide roller is provided, and the magnetic head cooperates with the unsupported span of tape extending between a tape reel and the guide roller.

12. A guide arrangement as claimed in claim 1, wherein two guide rollers arranged in spatial relationship are provided, and the magnetic head cooperates with the unsupported span of tape extending between the two guide rollers.

13. A guide arrangement as claimed in claim 10, wherein the guide surfaces, when viewed in plan, are each provided with a ring of holes, so that a pumping action is obtained when the guide roller rotates, cushions of air thus being produced for the stabilization of the guide roller as it rotates.

14. A guide arrangement as claimed in claim 10, wherein the opposite outer arcuate edges of the guide surfaces are provided with bevelled guide portions for centering the tape in the central plane of rotation of the guide roller.

15. A guide arrangement as claimed in claim 10, wherein the guide roller is provided with a convex guide surface.

16. A tape transport apparatus comprising:

a central capstan, take-up and supply reels, support means rotatably mounting said reels, respectively, and in turn being mounted for movement towards and away from said capstan, biasing means for urging said support means toward said capstan, the capstan being provided with a resilient peripheral portion so as to produce compressive forces between the capstan and the take-up and supply reels and hence driving forces for rotating the reels, and a magnetic head, and said apparatus further comprising:

at least one guide roller mounted for rotation about a relatively stationary axis, the tape leaving the supply reel being guided over said guide roller and said magnetic head to the take-up reel where it is wound up, and comprising two relatively stationary guide surfaces, each facing said guide roller on one side thereof and extending around part of the periphery of the guide roller.

17. A tape transport apparatus as claimed in claim 16, wherein the guide surfaces each have an ingress and an egress chamfer for the tape, and are arranged around part of the periphery of the guide roller in an arc $\beta$ of at least $90° - 2\alpha$, preferably in an arc $\beta$ of $180° - 2\alpha$, $\alpha$ being the arc length of one of the chamfers.

* * * * *